Sept. 29, 1942.  M. A. WEST  2,296,887
SCREW
Filed Oct. 17, 1941  2 Sheets-Sheet 1

MAXWELL A. WEST
INVENTOR.

BY

ATTORNEYS

Sept. 29, 1942.                     M. A. WEST                        2,296,887
                                      SCREW
                   Filed Oct. 17, 1941            2 Sheets-Sheet 2

MAXWELL A. WEST
                                                       INVENTOR.
                              BY  T. J. Geisler
                                   and T. R. Geisler
                                                       ATTORNEYS Patented Sept. 29, 1942

2,296,887

UNITED STATES PATENT OFFICE 2,296,887

SCREW

Maxwell A. West, Portland, Oreg., assignor to Champion, Inc., Portland, Oreg., a corporation of Oregon Application October 17, 1941, Serial No. 415,457

7 Claims. (Cl. 85—45)

This invention relates to a screw having a recessed head, and relates, in particular, to a screw with a head recess of cruciform shape.

More specifically, this invention concerns a recessed screw closely resembling that described in U. S. Letters Patent No. 2,216,382, issued October 1, 1940, and this invention provides certain further improvements in the recess of the screw described in that patent.

One of the objects of the present invention is to provide an improved recessed screw similar to, and having all of the advantages of, the recessed screw as set forth in said U. S. Letters Patent mentioned in the preceding paragraph, but in which the recess will be somewhat easier to make or to punch out.

Another object of this invention is to provide a screw recess which will cooperate more effectively with a screw driver of the type described in U. S. Letters Patent No. 2,218,631, issued October 22, 1940, and with a driver tip more fully described in my co-pending application Serial Number 358,900, entitled "Driver tool."

A further object of this invention is to provide a screw recess which may be more or less standardized for a considerable size range of screws and which will enable the same driver to be used for screws of different size, either without any change whatever, or with only slight change.

The manner in which these objects are attained through the present invention will be apparent from the following brief description in which reference is to be made to the accompanying drawings.

Figure 1:
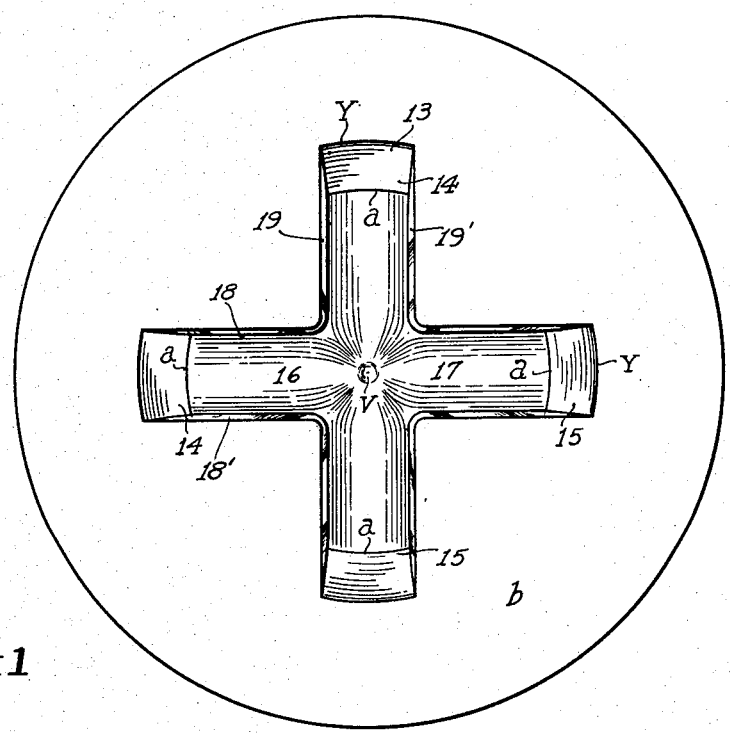
Figure 1 is a plan view of a screw head showing a recess embodying the improvements of this invention, the screw head being drawn larger than normal size for the sake of clarity.

In the drawings, Figures 1 to 6 inclusive illustrate the present invention as applied to flat head screws. However, the invention is equally applicable to practically all conventional shapes of screw heads, and, consequently, is not to be understood as limited to any particular shape or type of screw.

Figure 2:
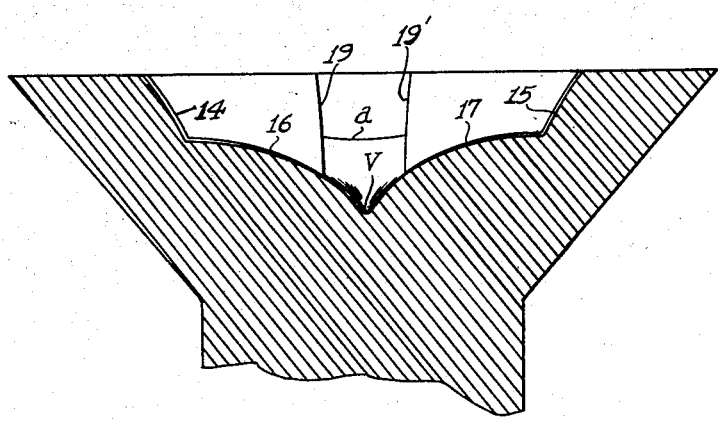
Figure 2 is a vertical section taken through the center of the screw of Figure 1 and drawn to the same size.

My improved recess, as shown in Figures 1 and 2, is formed by a pair of identical slots which intersect on the axis of the screw. While the length of these slots will depend upon the diameter of the screw head, the width of the slots is made uniform for a considerable range of ordinary screw sizes, as will be explained later. The end walls 14 and 15 of the slots are curved inwardly and downwardly from the top face of the screw head. The bottom walls 16 and 17 of the slots also curve inwardly and downwardly, as shown in Figure 2. In these respects, my improved screw recess is similar to that described in U. S. Patent No. 2,216,382 above mentioned.

The end walls 14 and 15 and the bottom walls 16 and 17, however, in addition to being curved convexly longitudinally of the slots, are also formed so as to present surfaces which are concaved transversely. Thus, not only will the intersections of the end walls 14 and 15 with the plane b, constituting the top face of the screw, (Figure 1), form curved lines, as indicated at Y, but the intersections of the end walls with the bottom walls will also form curved lines as indicated at a. (In the recessed screw of Patent No. 2,216,382 the bottom walls and end walls intersect each other in straight lines.) This transverse curvature continues along the bottoms 16 and 17 of the slots from the outer extremities towards their intersection at the center or screw axis, but, when these bottom surfaces of adjacent slots come together, their common curvature becomes merged into a conical surface which extends downwardly and towards the screw axis to the vertex of the recess. The vertex V of the recess, however, is preferably rounded, as indicated in Figures 1 and 2.

Figure 3:
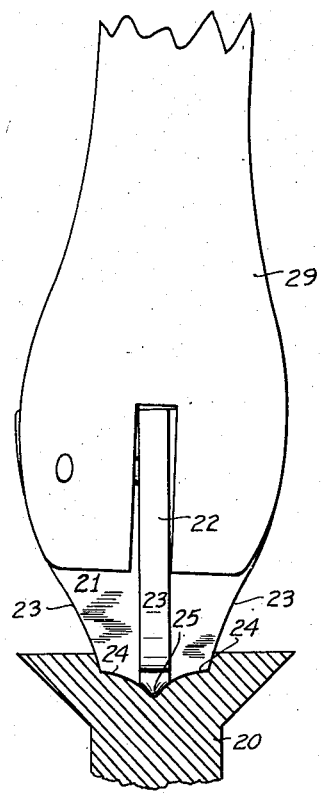
Figure 3 is a similar vertical sectional view, drawn to a smaller scale, showing a driver tool inserted in the recess of the screw head.
Figure 7:
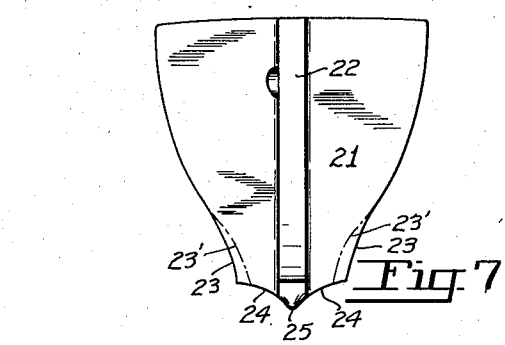
Figure 7 is an elevation of the driver bit of Figure 3, the broken lines indicating how the bit can be cut down to fit exactly the recess of the smaller screw of Figures 4 and 6.
Figure 8:
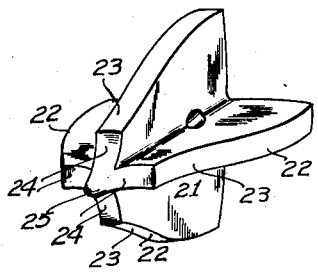
Figure 8 is a view, in perspective, of the bit of Figures 3 and 7.
Figure 5:
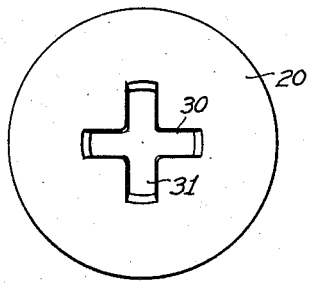
Figures 5 and 6 are plan views of the screws of Figures 3 and 4 respectively with the driver, or driver bit, removed.

With the bottom surfaces of the recess formed in this manner, the recess will accommodate more perfectly the driver bit illustrated in Figures 3, 7 and 8 of the accompanying drawings. The bottom or end surfaces 24 of the wings 21 and 22, of the driver bit, as will be apparent from Figure 8, are rounded in a plane normal to the axis of the bit and converge into a smooth conical surface with a rounded tip 25. As explained in the co-pending application Serial Number 358,900, above mentioned, this surfacing of the tip of the driver has an advantage in preventing the marring of the top of the side walls of the screw recess if the driver is rotated while an attempt is made to insert the bit into the recess.

There is a further advantage in having the bottom surfaces of the recess shaped to conform more closely to the end or bottom surfaces of the wings of the driver or bit in that the screw recess may be made quite shallow, and considerably more shallow than that of other recessed screws now on the market, thus enabling the recess to be formed or punched with less difficulty. The transverse, as well as longitudinal, curvature of the bottoms of the slots of the recess is also more easily attainable in the forming of the recess than a flat bottom would be, and thus my improved recess will be found more practical to make.

The side walls 18, 18' 19, 19' of the slots are not absolutely vertical for a substantial distance and with a taper at the top, as is the case with the walls of the recess of the screw illustrated in my earlier U. S. Patent No. 2,216,382; nor are these side walls in the recess of my present invention formed with a decided taper throughout their entire extent, as is the case with some of the recessed screws in present use—which continuous taper would tend to cause the driver to be forced upwardly and out of the recess and result in possible marring of the screw and recessed head, when torque strain is developed in the turning of the screw. Instead, these side wall surfaces, as will be observed in Figure 2, are slightly convex from bottom to top, and at the top the opposite side walls of each slot are slightly wider apart than at the bottom. The lines of intersection which each side wall makes with the bottom of the slot and with the top face of the screw, as apparent from Figure 1, lie, for the most part, in the same oblique plane, but the intervening wall surface, because of its convexity, is not confined to this oblique plane. Due to this convex surface and to the fact that the slots of the recess are only slightly wider at the top than at the bottom, the portions of the side walls adjacent the bottom of the recess do nevertheless present surfaces which are substantially vertical, or sufficiently close to being vertical, to provide proper bearing surfaces for the corresponding engaging surfaces of the wings 21 and 22 of the bit. Consequently there is no tendency for the bit in question to be forced out of the recess during the driving of the screw, but such tendency would exist if the side walls were caused to present a decided outwardly tapering surface throughout their entire extent, as previously mentioned.

I have found that it is much more difficult to punch out a recess in which the side walls will be absolutely vertical throughout, or even vertical for a substantial distance, than a recess in which the side walls constitute tapered plane surfaces for their entire extent. However, with the side walls formed in accordance with my present invention this difficulty in the punching operation is overcome, but without the sacrifice of a proper bearing surface. The fact that this proper bearing surface for the bit is maintained at the bottom of the side walls is also a contributing factor in making it possible to have my improved recess comparatively shallow without the loss of any of the decided advantages afforded by this recess, when the screw is used in combination with the special driver tool indicated.

Figure 4:
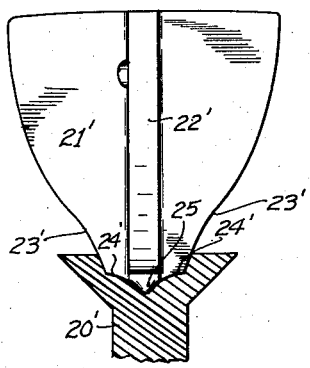
Figure 4 is a corresponding sectional view of a smaller screw with the driver bit inserted in the recess, illustrating how the driver bit for the screw of Figure 3 can be used, with slight change, in the smaller screw of Figure 4.
Figure 6:
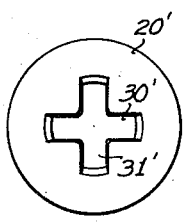

An objection to some of the recessed screws now on the market is the fact that they not only require a special driver which is more expensive to make and shorter lived than ordinary screw drivers, but also that a separate driver is required for every size of screw. With my improved screw recess, I have found it possible and practical to have the slots of the recess of uniform width throughout a considerable range of screw sizes, the only difference in the recesses of a large screw and a small screw within the group being in the length to which the slots are extended radially from the center axis. Figures 3, 4, 5, and 6 illustrate my recess as applied to two screws of considerably different size. The slots 30', 31' of the small screw 20' of Figures 4 and 6 are the same width as, and identical in all respects to, the slots 30 and 31 of the larger screw 20, except that the slots of the larger screw are longer. The wings 21', 22' and 21, 22 of the smaller and larger bits respectively are made of uniform thickness throughout. The smaller bit could be used to drive the larger screw, although of course the larger bit would have a slightly larger wing bearing surface. The larger bit, on the other hand, could easily be cut down for use in the smaller screw merely by cutting away the lower sides 23 (Figure 7) of the wings to correspond to the portions 23' as indicated—an operation very quickly and easily performed in an ordinary lathe.

It is essential, of course, when my recess is made comparatively shallow, as indicated in Figures 3 and 4, that the driver bit be properly seated in the bottom of the recess at all times. When a driver bit of the type illustrated is mounted in the driver shank by a universal joint, in the manner shown and also as described in my U. S. Patent No. 2,218,631, previously mentioned, the proper seating of the driver bit is assured even though the driver be inadvertently, or of necessity, held out of alignment with the screw axis.

In combination with the special driver illustrated this improved recessed screw thus affords certain advantages over the recessed screw of my previous Patent No. 2,216,382, and as briefly indicated, is also, under some conditions, easier to manufacture. At the same time it has all the advantageous features of the recessed screw described in Patent No. 2,216,382, including the important facts that it is driven from the bottom of the recess and that the bearing surfaces for the end of the driver in the recess are substantially vertical.

I claim:

1. In a screw head, a slot extending across the screw axis, the side walls of said slot being slightly convex from bottom to top, said walls being slightly wider apart at the top of the slot than at the bottom, the bottom of said slot being concaved transversely.

2. A screw having a head formed with a driving recess comprising, a plurality of similar symmetrically-spaced slots intersecting on the screw axis, said slots terminating short of the periphery of the screw head, the end wall of each slot sloping downwardly and inwardly, the side walls of each slot being slightly convex from bottom to top, said walls being slightly wider apart at the top of the recess than at the bottom, the bottom of each slot constituting a convex surface extending inwardly from the bottom of the end wall towards the screw axis, the bottom wall of each slot being concaved transversely.

3. A screw having a head formed with a driving recess of cruciform shape comprising a plurality of similar symmetrically-spaced slots intersecting on the screw axis, said slots terminating short of the periphery of the screw head, the end wall of each slot, formed into a downwardly extending convex surface, the side walls of each slot being slightly convex from bottom to top, said walls being slightly wider apart at the top of the recess than at the bottom, the bottom of each slot constituting a convex surface extending inwardly and downwardly from the bottom of the end wall towards the screw axis, the bottom and end walls of each slot being concaved transversely, the bottoms of said slots merging into a conical surface at their intersection about the screw axis.

4. A screw having a head formed with a driving recess comprising a plurality of similar symmetrically-spaced slots intersecting on the screw axis, the side walls of each slot being slightly convex from bottom to top, said walls being slightly wider apart at the top of the slot than at the bottom, the bottom of each slot constituting a convex surface extending inwardly and downwardly from the end of the slot towards the screw axis, the bottom of each slot being concaved transversely, the bottoms of said slots merging into a conical surface at their intersection about the screw axis, said conical surface extending downwardly with its vertex on the screw axis, and the vertex of said central conical portion of said recess being rounded.

5. In a screw head, a slot extending across the screw axis, the side walls of said slot being slightly convex from bottom to top, said walls being slightly wider apart at the top of said slot than at the bottom.

6. In a screw head, a plurality of similar slots intersecting on the screw axis, the side walls of each slot being slightly convex from bottom to top, said walls being slightly wider apart at the top of each slot than at the bottom, the intersections of said walls with the top face of the screw head being parallel.

7. In a screw head, a plurality of similar slots intersecting on the screw axis, the bottom of each slot extending inwardly and downwardly towards the screw axis, the bottom of each slot being concaved transversely, and the bottoms of said slots merging into a conical surface at their intersection about the screw axis.

MAXWELL A. WEST.